United States Patent
Ivanichkina et al.

(10) Patent No.: US 10,241,878 B2
(45) Date of Patent: Mar. 26, 2019

(54) SYSTEM AND METHOD OF DATA ALLOCATION PROVIDING INCREASED RELIABILITY OF STORAGE

(71) Applicant: Acronis International GmbH, Schaffhausen (CH)

(72) Inventors: Lyudmila Ivanichkina, Bryansk (RU); Kirill Korotaev, Dolgoprudny (RU); Stanislav Protasov, Moscow (RU); Serguei Beloussov, Singapore (SG); Mark Smulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 174 days.

(21) Appl. No.: 15/079,303

(22) Filed: Mar. 24, 2016

(65) Prior Publication Data

US 2017/0277610 A1  Sep. 28, 2017

(51) Int. Cl.
*G06F 11/00* (2006.01)
*G06F 11/20* (2006.01)
*G06F 3/06* (2006.01)

(52) U.S. Cl.
CPC .......... *G06F 11/2094* (2013.01); *G06F 3/065* (2013.01); *G06F 3/067* (2013.01); *G06F 3/0611* (2013.01); *G06F 3/0619* (2013.01); *G06F 3/0631* (2013.01); *G06F 2201/805* (2013.01)

(58) Field of Classification Search
CPC .................................................. G06F 11/2094
See application file for complete search history.

(56) References Cited

U.S. PATENT DOCUMENTS

| | | | | |
|---|---|---|---|---|
| 7,581,163 | B1* | 8/2009 | Zhou | G06F 11/141 |
| | | | | 714/805 |
| 2010/0070789 | A1* | 3/2010 | Hori | G06F 1/3221 |
| | | | | 713/324 |
| 2014/0297943 | A1* | 10/2014 | Milos | G06F 3/0611 |
| | | | | 711/114 |

(Continued)

OTHER PUBLICATIONS

"Copysets: Reducing the Frequency of Data Loss in Cloud Storage", Cidon et al., Proceedings of the 2013 USENIX conference on Annual Technical Conference, 37-48, San Jose, CA, Jun. 26-28, 2013.

*Primary Examiner* — Bryce P Bonzo
*Assistant Examiner* — Katherine Lin
(74) *Attorney, Agent, or Firm* — Arent Fox LLP; Michael Fainberg

(57) ABSTRACT

A system and method is disclosed for storing a block of data in a distributed data-storage system. An example method includes identifying a list of a plurality of disks in the distributed data-storage system, randomly selecting a disk from the list of the plurality of disks and adding the selected disk to a subset of disks allocated for a copyset, and continuously performing the step of randomly selecting the disk and adding the disk to the subset of disks until the copyset contains a predetermined amount of allocated disks from the distributed data-storage system. Furthermore, this process is repeated to perform a plurality of copysets. Once the copysets are defined, the method further includes dividing the block of data into a number of data chunks equal to the predetermined amount of allocated disks, and, distributing the data chunks onto disks of one of the plurality of the copysets.

21 Claims, 10 Drawing Sheets

(56) References Cited

U.S. PATENT DOCUMENTS

2015/0324145 A1* 11/2015 Akutsu ................ G06F 3/0617
                                                              711/114
2017/0147458 A1*  5/2017 Epstein ............... G06F 11/2097

* cited by examiner

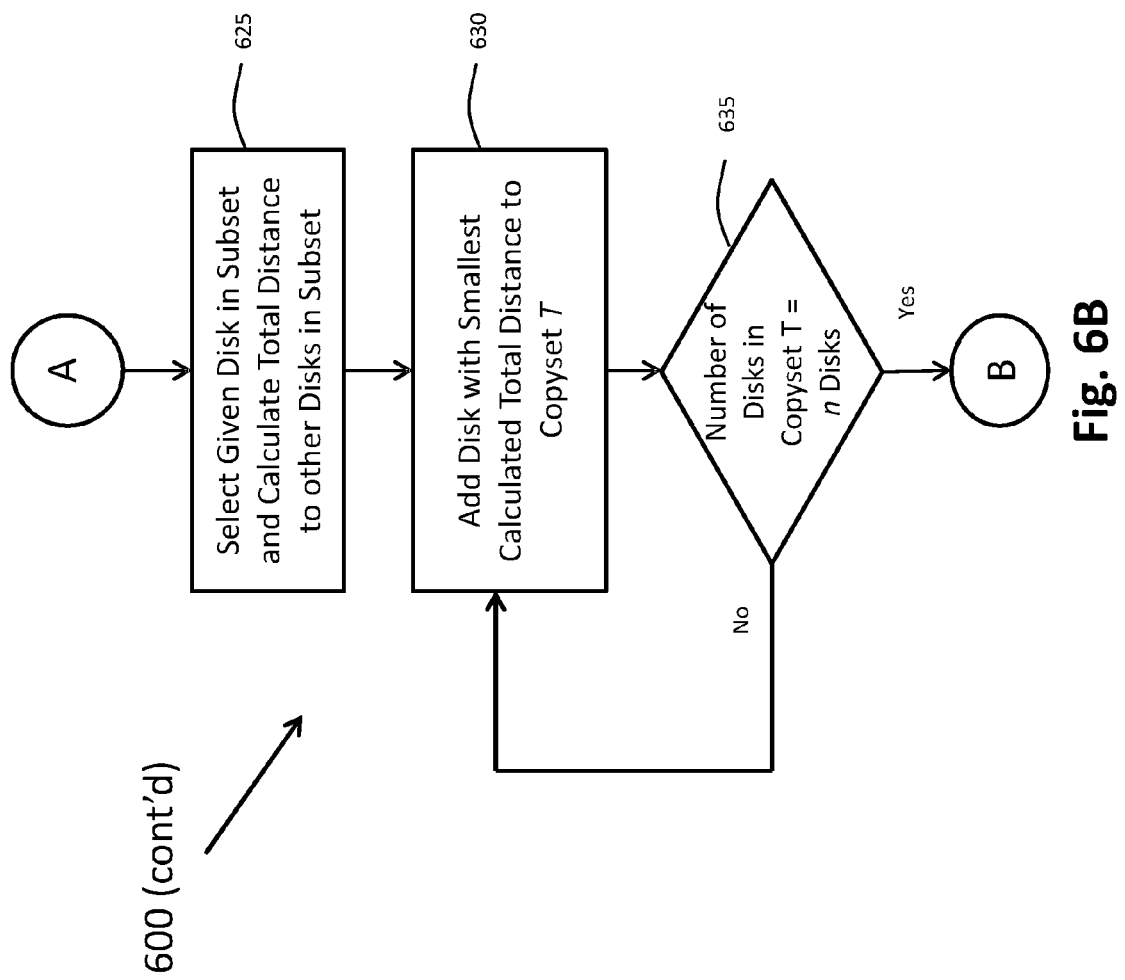

SYSTEM AND METHOD OF DATA ALLOCATION PROVIDING INCREASED RELIABILITY OF STORAGE

FIELD OF TECHNOLOGY

The present disclosure generally relates to the field of electronic data backup, and, more specifically, to a system and method for efficiently storing a block of data in a distributed data-storage system.

BACKGROUND

Distributed data-storage systems ("DSSs") are complicated software solutions that operate over hardware infrastructures consisting of a large number of servers of various designations that are connected together by multiple communication channels. Existing DSSs are subject to various kinds of hardware failures, including total or partial switching off of the electrical supply, network failures that may result in the DSS being divided into separate unconnected segments, disk failures, and the like.

Conventionally, there are two main approaches to ensuring reliability of data storage in conditions of failure, based on the duplication of information and the spreading of data over different components of the distributed data-storage system. The first approach is data replication and the second approach is erasure coding.

In general, data replication is the storage of each block of data (i.e., file or object, depending on the architecture of the data-storage system) in several copies on different disks or different nodes of the system. As a result, replication makes it possible to ensure maximum efficiency of data access, including a significant increase in speed of read access to data frequently used by different clients. However, data replication can be very costly from the perspective of the amount of disk space needed to create the several copies of each block of data.

Moreover, noiseless (or lossless) coding is based on the use of mathematical algorithms that make it possible, to generate n chunks (i.e., data fragments) of a block of data using compression techniques in such a way that any k chunks will be sufficient to recover the initial block of data. Each of the n chunks obtained should be written to a separate disk, and, preferably, to a separate server to ensure high availability of the data. The reliability of a scheme of noiseless coding with parameters n,k (an "(n,k) scheme") is comparable to the reliability with replication of data with n−k+1 copies of each data block. Thus, the use of noiseless coding makes it possible to reduce considerably the overheads on data storage necessary for data replication—the redundancy of data storage (i.e., including the ratio of the volume of storable data to the volume of useful data) for an (n,k) scheme is equal to n/k (the size of a data chunk is approximately equal to $Size_{Block}/k$, where $Size_{Block}$ is the volume of the initial block of data). The most widely used error-correcting codes in modern software systems of data storage are Reed-Solomon codes and variations, such as Cauchy codes, for example.

Due to the size and complexity of DSSs necessary for large volumes of data, the reliability of storage and accessibility of data in these systems depends not only on the number of replicas or parameters of the noiseless-coding scheme being used, but also on the global scheme of data distribution, which determines to a considerable degree the performance of the storage system.

Currently, the most widespread method of distribution of data in modern DSSs is randomized distribution of data chunks over the disks or servers of the system. The popularity of the randomized distribution method is based on both: (1) the simplicity of realization, which does not require the concrete hardware of the network topology of the cluster to be considered, and (2) the fact that a random distribution of the data makes it possible to ensure a sufficiently uniform load over the various nodes of the cluster without using complicated heuristic load-balancing algorithms. Furthermore, a random distribution of data over the disks in the cluster makes it possible to significantly speed up the rate of recovery based on potential parallel recovery of data that had been stored on different sets of disks. Random distribution of data and variants of it are used in such distributed systems as HDFS ("Hadoop® Distributed File System"), GFS ("Google® File Systems"), and the like.

Nevertheless, when a random scheme of data distribution is used for data storage, it is virtually inevitable that there will be loss of data when there is a correlated failure of several disks. For a distribution strategy using a completely random choice of disks for storage of chunks of a block coded by means of the (n,k) scheme, the probability of losing data in the cluster with sufficiently large amount of data blocks when more than n−k disks crash simultaneously grows with the number of disks in the cluster and is close to 1 for storage cluster with hundreds of disks.

This problem occurs due to a large number of variants of the arrangement of chunks of the block, and specifically by a large number of sets of n disks, each of which contains the data of one or several blocks. This results in an increase in the probability of failure when n−k+1 disks crash at the same time, since the probability of an event in which all the failed disks belong to a set of disks that corresponds to one of the blocks of data is increased because the number of disk set variants increases (i.e., the probability increases with an increase in the number of disk set variants).

On the other hand, grouping the disks into nonintersecting sets of n elements (e.g., of the type of RAID 6 independent arrays) helps to increase significantly the reliability of the storage, but does not solve the problem completely, since the time of recovery of the data is increased on account of the decrease of the number of disks from which data can be read in parallel during the recovery. Moreover, the efficiency of access to the data for reading is reduced as a whole.

Furthermore, it should be appreciated that increasing the number n−k of chunks of the control sums also does not solve the problem for a sufficiently large number of disks (i.e., the probability of data loss remains high), and, thus, high overheads and a significant reduction in performance can be expected. In addition, the parameter n of the (n, k) scheme needs to be increased to provide the same redundancy level, but increasing the number of chunks in the (n,k) coding scheme leads to increased latencies in the system on read access since read access latency will be the maximum latency across all chunk read latencies.

SUMMARY

Accordingly, a system and method is disclosed herein for a data storage technique using Reed-Solomon codes rather than conventional data replication and further modifying it to allow use of existing policies of data distribution in persistent storage.

In one aspect, an exemplary method is disclosed for storing a block of data in a distributed data-storage system. According to this aspect, the method includes identifying, by a processor, a list of a plurality of disks in the distributed data-storage system; randomly selecting, by the processor, a disk from the list of the plurality of disks and adding the selected disk to a subset of disks allocated for a copyset; continuously performing, by the processor, the step of randomly selecting a disk and adding the disk to the subset of disks until the copyset contains a predetermined amount of allocated disks from the distributed data-storage system; repeating, by the processor, the randomly selecting and continuously performing steps to allocate a plurality of subsets of disks for a plurality of copysets, respectively; dividing, by the processor, the block of data into a number of data chunks equal to the predetermined amount of allocated disks; and distributing, by the processor, the data chunks onto disks of one of the plurality of copysets.

According to another exemplary aspect, the method includes removing the selected disk from the list of the plurality of disks once the selected disk is added to the subset of disks allocated for the copyset.

According to another exemplary aspect, the method includes identifying a failure domain for the plurality of disks in the distributed data-storage system, wherein the step of randomly selecting the disk from the list of the plurality of disks comprises selecting the disk from the identified failure domain.

According to another exemplary aspect, the method includes determining a plurality of locality groups of the plurality of disks in the distributed data-storage system, wherein the step of distributing the data chunks onto respective disks of the respective copyset comprises distributing at least a portion of the data chunks within at least one of the locality groups.

According to another exemplary aspect, the method includes calculating a total distance from the selected disk to each of a portion of the plurality of disks; and adding additional disks to the subset of disks allocated for the copyset based on the disks having the smallest calculated total distance from the selected disk.

According to another exemplary aspect, the total distance is calculated based on network topology of the distributed data-storage system and respective weights of each of the plurality of disks, wherein the respective weights corresponds to a volume of system data stored on each disk.

According to another exemplary aspect, the distributing of the data chunks onto disks of one of the plurality of copysets comprises randomly selecting the copyset from among the plurality of copyset.

According to an exemplary aspect, a distributed data-storage system is provided for storing a block of data. According to this aspect, the system includes a plurality of disks configured to store data; and a processor configured to identify a list of the plurality of disks, randomly select a disk from the list of the plurality of disks and add the selected disk to a subset of disks allocated for a copyset; continuously randomly select additional disks from the list of the plurality of disks and add the additional disks to the subset of disks until the copyset contains a predetermined amount of allocated disks from the distributed data-storage system, repeat the randomly selecting the disk and the additional disks to allocate a plurality of subsets of disks for a plurality of copysets, respectively, divide the block of data into a number of data chunks equal to the predetermined amount of allocated disks, and distribute the data chunks onto disks of one of the plurality of copysets.

According to an exemplary aspect, a non-transitory computer readable medium storing computer executable instructions is disclosed for storing a block of data in a distributed data-storage system. According to this aspect, instructions are included for identifying, by a processor, a list of a plurality of disks in the distributed data-storage system; randomly selecting, by the processor, a disk from the list of the plurality of disks and adding the selected disk to a subset of disks allocated for a copyset; continuously performing, by the processor, the step of randomly selecting a disk and adding the disk to the subset of disks until the copyset contains a predetermined amount of allocated disks from the distributed data-storage system; repeating, by the processor, the randomly selecting and continuously performing steps to allocate a plurality of subsets of disks for a plurality of copysets, respectively; dividing, by the processor, the block of data into a number of data chunks equal to the predetermined amount of allocated disks; and distributing, by the processor, the data chunks onto disks of one of the plurality of copysets.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 6A-6C illustrates a flowchart for a method for performing distributed data storage according to an exemplary aspect taking into account the distance based on the network topology and the disk weight.

DETAILED DESCRIPTION

Figure 1:
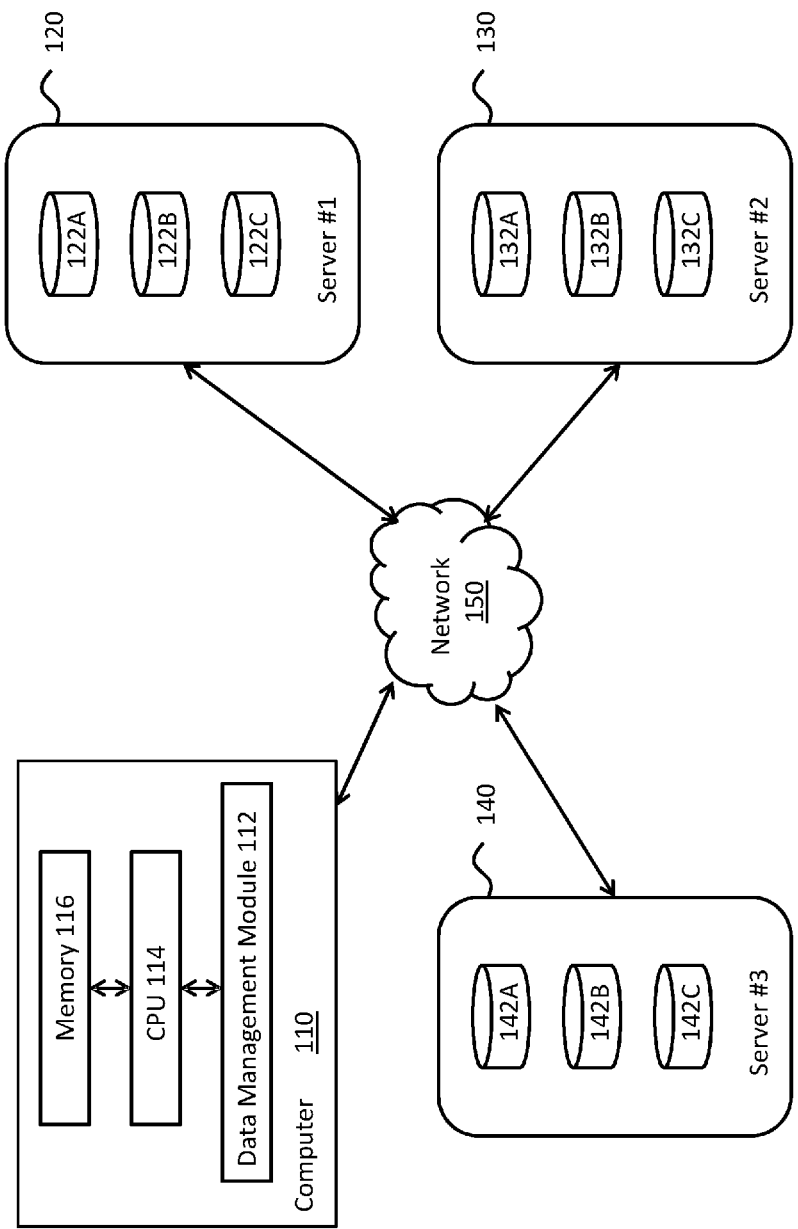
FIG. 1 is a block diagram illustrating the distributed data storage system and method disclosed herein implemented in a distributed data storage environment according to an exemplary aspect.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

FIG. 1 is a block diagram illustrating the distributed data storage system and method disclosed herein implemented in a distributed data storage environment according to an exemplary aspect. In general, the system and method provides for a data storage technique using Reed-Solomon codes and allows the use of existing policies of data distribution in persistent storage. It should be appreciated that according to an alternative aspect, erasure coding techniques (different from Reed-Solomon codes) can be employed as long as the algorithm preferable can produce n chunks from the data block so that the system can restore the data from any k chunks as should be appreciated. The exemplary aspect contemplates Reed-Solomon codes because they are a subset of codes with optimal repair properties (e.g., MDS-codes ("Maximum Distance Separable codes")).

As shown in FIG. 1, the distributed data storage system includes a computer 110, a plurality of storage nodes (i.e., the servers and/or associated disks) 120, 130, 140, and a network 150. The storage nodes are in communication with a computer 110 through the network 150. As explained in detail below, the computer 110 is configured to control the distributed data storage methods according to the algorithms disclosed herein. In particular, based on these algorithms, the computer 110 can store one or more blocks of data in the system by distributing chunks the data across the disks of the storage notes, i.e., servers 120, 130 and 140. It should be appreciated that the chunks are fragments of the original block of data.

As generally shown, each of the servers 120, 130 and 140 comprises a plurality of disks for data storage. That is, server 120 includes disks 122A, 122B and 122C, server 130 includes disks 132A, 132B and 132C and server 140 includes disks 142A, 142B and 143C. It should be appreciated that three servers and three disks per server is shown according to illustrated aspect, but that the exemplary aspect is in no way intended to be limited to this number of servers and/or disks.

Furthermore, it is contemplated that each of the servers 120, 130 and 140 can generally include hardware and software components configured to manage various storage resources within the computing environment. According to the exemplary aspect, each of the disks can be a typical data storage device (e.g., hard disk drives, optical drives, magnetic tape drives and/or the like). In conjunction with the computer 110 and the network 150, the servers 120, 130 and 140 collectively form the data distributed system that is provided to facilitate temporary and/or permanent storage of computer data. The computer data may be any type of electronic, digital data generated and/or stored by a computer. For example, the computer data can represent text data, executable program code, or any other type of digital data. It is further contemplated according to one aspect that the servers can be provided as forming an online/remote file storage service (e.g., a cloud computing service) in one aspect, but alternatively can be incorporated into a local area network or the like as should be appreciated to those skilled in the art.

As further noted above, the computer 110 is capable of communicating with the servers via network 150. According to the exemplary aspect, the computer 110 may be any type of computing device and preferably a separate server configured to manage the distributed data-storage system, but alternatively can be a laptop, a desktop, and the like. The specific details of the exemplary computer 110 will be described below with respect to FIG. 7. However, as generally shown in FIG. 1, the computer 110 includes data management module 112, computer-processing unit ("CPU") 114 and memory 116. Moreover, it should be appreciated that while the exemplary aspect is described as being implemented on single computer 110, the system and method can also be implemented on multiple computers according to an alternative aspect. Thus, for the purpose of high availability, the system can include several computers with such services deployed and services have some consensus protocol to communicate and agree on each other action.

According to one aspect, the data management module 112 includes software code (e.g., processor executable instructions) in memory, which may be configured to execute/facilitate the algorithms described below for distributed data storage. As shown, the computer 110 includes CPU 114 for executing the data management module 112 and memory 116 according to an exemplary aspect.

Furthermore, network 150 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 150 may employ various well-known protocols to communicate information amongst the network resources. In one aspect, the network 150 can be part of the Internet or intranet using various communications infrastructure such as Ethernet, WiFi and the like.

Figure 2:
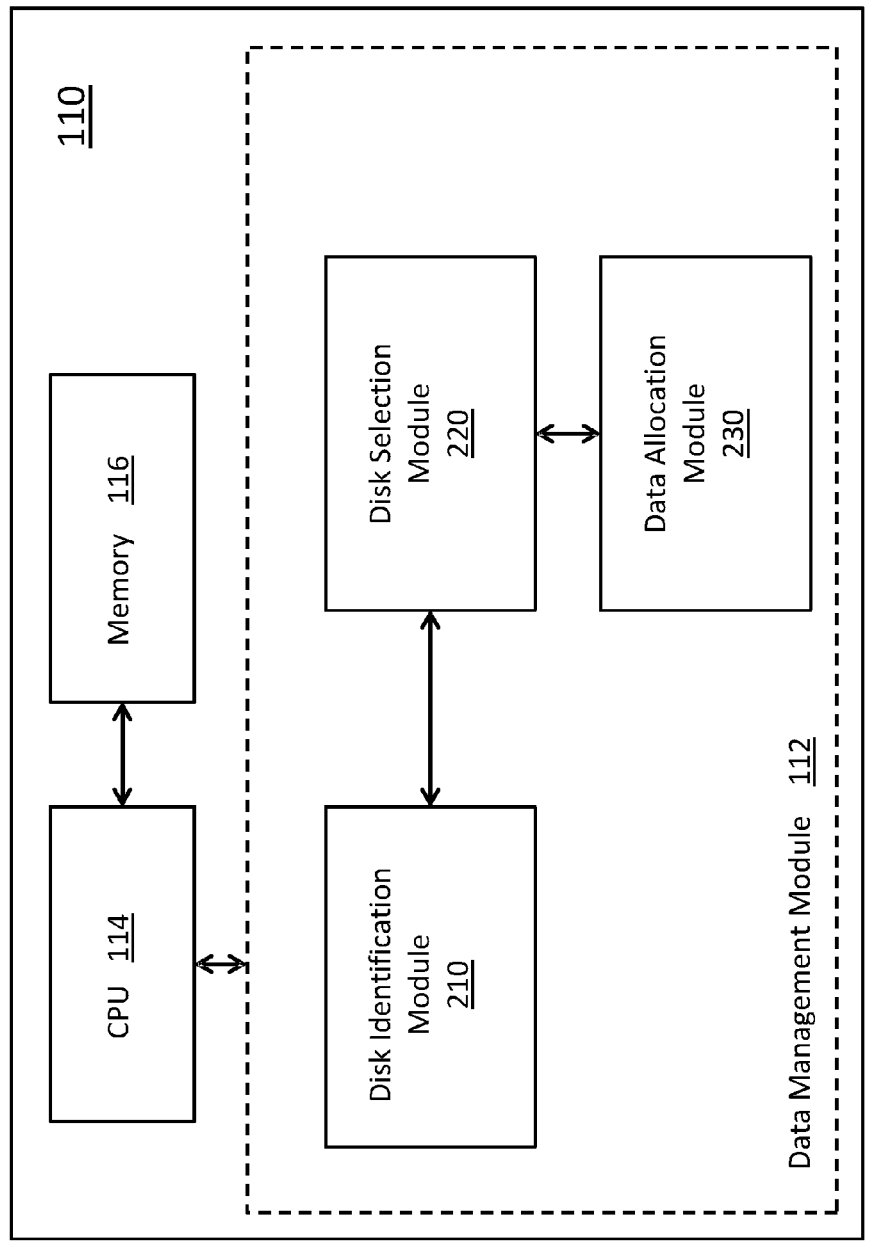
FIG. 2 illustrates a block diagram of a computer for storing a data block within a distributed data storage system according to an exemplary aspect.

FIG. 2 illustrates a block diagram of a computer for storing a data block within a distributed data storage system according to an exemplary aspect. In particular, the client computer shown in FIG. 2 illustrates a more detailed view of the computer 110 of system 100 described above with respect to FIG. 1.

As noted above, the computer includes a CPU 114 and memory 116. Furthermore, the computer 110 includes a data management module 112 that is configured to the algorithms described below for determining copysets for data storage and allocation according to the exemplary aspect. According to the exemplary aspect shown in FIG. 2, the data management module 112 can be composed of a plurality of modules. As used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown, the data management module 112 can include a disk identification module 210, a disk selection module 220 and a data allocation module 230. For purposes of the disclosure below with respect to the exemplary algorithms, the disclosure generally refers to the data management module 112 as performing the various steps, but it should be appreciated that the applicable modules shown in FIG. 2 is provided to perform such steps according to an exemplary aspect. For example, the disk identification module 210 is provided to identify the plurality of disks available for storage in the distributed data storage system. These disks, for example, can be the nodes described above with respect to FIG. 1. Furthermore, the disk selection module 220 is provided for selecting/identifying a subset of the available disks for each copyset and also defining the copysets for data allocation (including selecting the disks). Moreover, the data allocation module 230 is configured to select the copyset to be used for data block allocation when the client contacts the data management service to write some data. In this instance, the data allocation module 230 is configured to select one of the plurality of copysets and allocate space on the disks of that copyset for the data allocation. According to one refinement of this aspect, the copyset is selected randomly by the data allocation module 230.

Next, the exemplary algorithms will be described herein for purposes of the exemplary system and method of distributed data storage. As described above, it should generally be appreciated that there is a low reliability of random schemes of distribution of data. Thus, according to an exemplary aspect, a reliable method and system of distributing data is disclosed using noiseless-coding algorithms. The described method and system does not affect the data-access efficiency and recovery rate that are characteristic for a random scheme of allocation, but also advantageously provides stability to simultaneous failures of a large number of disks and takes into account the data-distribution policies based on the properties of the hardware infrastructure of the specific distributed DSS, such as failure domain and/or locality group.

In view of the foregoing, the method and system disclosed herein provides an algorithm for generating a plurality of copysets (or tuples) of n disks designated for the allocation of different chunks of blocks of data. According to one aspect, on the one hand, the disclosed system and method limits the number of possible copysets, but also increases the number of disks that can be used in the recovery of data that have been stored on a damaged disk. As a result, the disclosed system and method improves (i.e., shortens) the recovery time after such a failure.

To assess the efficiency of the algorithm disclosed herein, the present disclosure applies a "scatter coefficient" that indicates the number of copysets in which a disk appears. In other words, if a disk is used for two separate copysets, the scatter coefficient of that disk is two. To more generally determine the scatter coefficient for a distributed DSS, the disclosed system and method applies the average value of the scatter coefficient for all disks of the system. As described in detail below, the scatter coefficient can be used to characterize the efficiency of the data-distribution scheme created by the disclosed system and method.

As a general premise, for the initial fixed choice of the set of copysets, the choice of a copyset for storing chunks of a specific block of data is made randomly. As a result, the data will be distributed relatively uniformly between the different copysets. According to the exemplary aspect, if the scatter coefficient for a certain disk of the system is equal to S (i.e., the disk appears in S copysets), and the disk contains data belonging to $N_{Blocks}$ different blocks of data, then, on average, $N_{Blocks}/S$ blocks belong to each of the S copysets. As such, when the given disk is replaced, the speed of data recovery can be increased by a factor of S while interrogating in parallel the data for recovery from different copysets of disks. According to one aspect, it should be appreciated that the maximum increase in speed of the recovery process is obtained when the intersection between the copysets is a minimum.

In accordance with this concept, it should be appreciated that the average number of intersections between copysets of disks is also an important property of the allocation scheme of the data, and it is preferable that the number of intersections is a minimum. In order to normalize the metric of the density of intersections for different schemes of allocation, the disclosure herein considers the ratio of the average number of intersections to the scatter coefficient of the scheme, or the ratio of the number of disks in the group from the S copysets for the optimal scheme of allocation (i.e., ~((n−1) S+1) for a sufficiently large number of disks) to the observed average number of disks for the group of copysets.

To evaluate efficient of recovery, consider the dependence of the average volume of lost data on the number of copysets of disks in the scheme of allocation of the data. Moreover, assume that the number of disks in the storage system is sufficiently large, that the distribution of the blocks of data between the copysets is uniform, and that the partition into copysets is close to the optimum partition. Under these assumptions, an event of unrecoverable loss of data presupposes that at least one block of data can be found for which more than n−k chunks were lost. In this case, all other data blocks belonging to the given copyset of disks will also be lost. The total size of these blocks when the scatter coefficient is equal to S can be estimated as $$\frac{Volume_{Disk}}{S} * \alpha,$$

where $Volume_{Disk}$ is the volume of the disk and $\alpha$ is the average fullness of the disks in the storage system. The average volume of useful data that were lost will be equal to:

$$\alpha \frac{k}{n} \frac{Volume_{Disk}}{S}$$

To calculate the average volume of lost data it is not necessary to take into account cases when more than one copyset of disks have been irrecoverably damaged. This is because, damage to one copyset compared to damage to two or more copysets has negligibly small probability.

Figure 3:
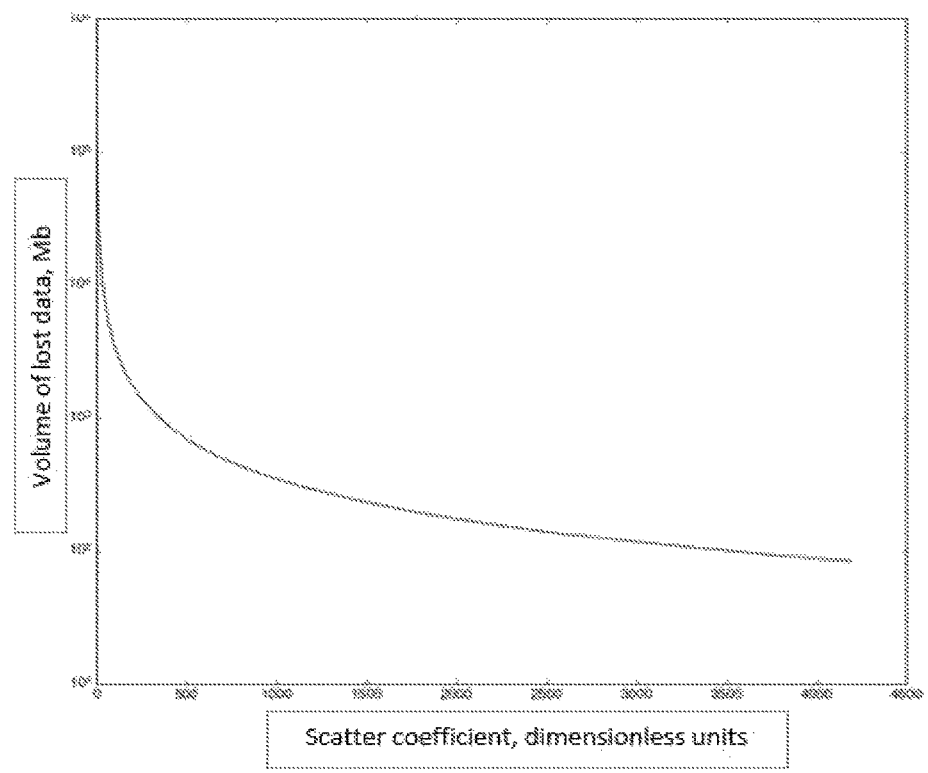
FIG. 3 is a chart (according to a logarithmic scale) that illustrates the dependence of the average volume of lost data on the scatter coefficient.

FIG. 3 is a chart (according to a logarithmic scale) that illustrates the dependence of the average volume of lost data on the scatter coefficient. As shown, the average volume of lost data is inversely proportional to the scatter coefficient S. Further, depending on the scheme used for the allocation of data, the average volume of lost data can vary from $$\alpha \frac{k}{n} Volume_{Disk}$$

(i.e., for a storage system consisting of independent RAID arrays of n disks) to $$\alpha \frac{k}{n} \frac{Volume_{Disk}}{N_{Blocks\ PerDisk}}$$

(i.e., for a random scheme of allocation of data), where $N_{Blocks\ Per\ Disk}$ is the average number of blocks with chunks stored on one disk of the system. Thus, depending on the architecture of the system, the average volume of lost data can range from hundreds of gigabytes of data to a few megabytes.

It should be appreciated that losses of a small volume of data can effectively lead to more serious losses, for example, damage to one megabyte of data within a virtual-machine image will be catastrophic for the given file. Thus, in addition to the average volume of damaged data it is also important to consider the average number of damaged files and their average size. Moreover, when large files are stored, storing the blocks of data in a small number of disk copysets, so as to decrease the probability of an unrecoverable loss of one of the blocks, which will lead to unrecoverable damage to the file.

As was noted above, any data-loss event involves high overheads associated with the investigation of the failure that has occurred and its consequences, and with the recovery of the damaged data. Therefore, the disclosed system and method attempts to minimize the frequency of catastrophic failures, even at the expense of an increase in the volume of data affected in the failure.

According to the exemplary aspect and as will be described in detail below, the method and system disclosed herein provide a flexible algorithm that accounts for special features of the hardware infrastructure of the provided data storage system. Furthermore, the disclosed method and system is configured to react adequately to local changes (e.g., removal or addition of one or more disks) or global changes (e.g., expansion of the data center by installation of new stacks or racks with disks) of the hardware infrastructure of the storage system. Furthermore, in addition to changes of the storage hardware, according to one aspect, the disclosed system and method is configured to take into account global changes in the software configuration of the DSS, such as a possible switching of the level on which account is taken of failure domains in the allocation of the data. For example, as will be described in detail below, when the failure domain changes from a smaller-scale to a larger-scale infrastructural unit (e.g., from a server to a stack or a rack of stacks), the disclosed system and method is capable of implementing migration of the data whose current allocation does not satisfy the new scheme.

Figure 4A:
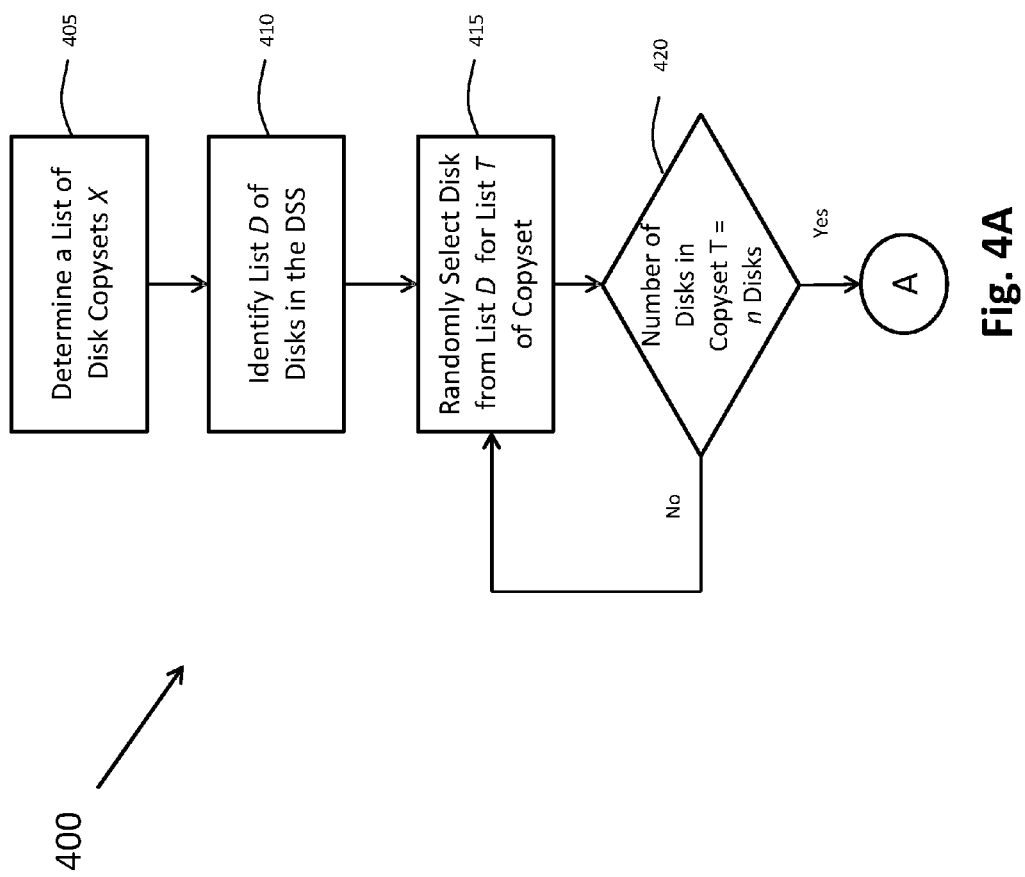
FIGS. 4A and 4B illustrates a flowchart for a method of performing distributed data storage according to an exemplary aspect.
Figure 4B:
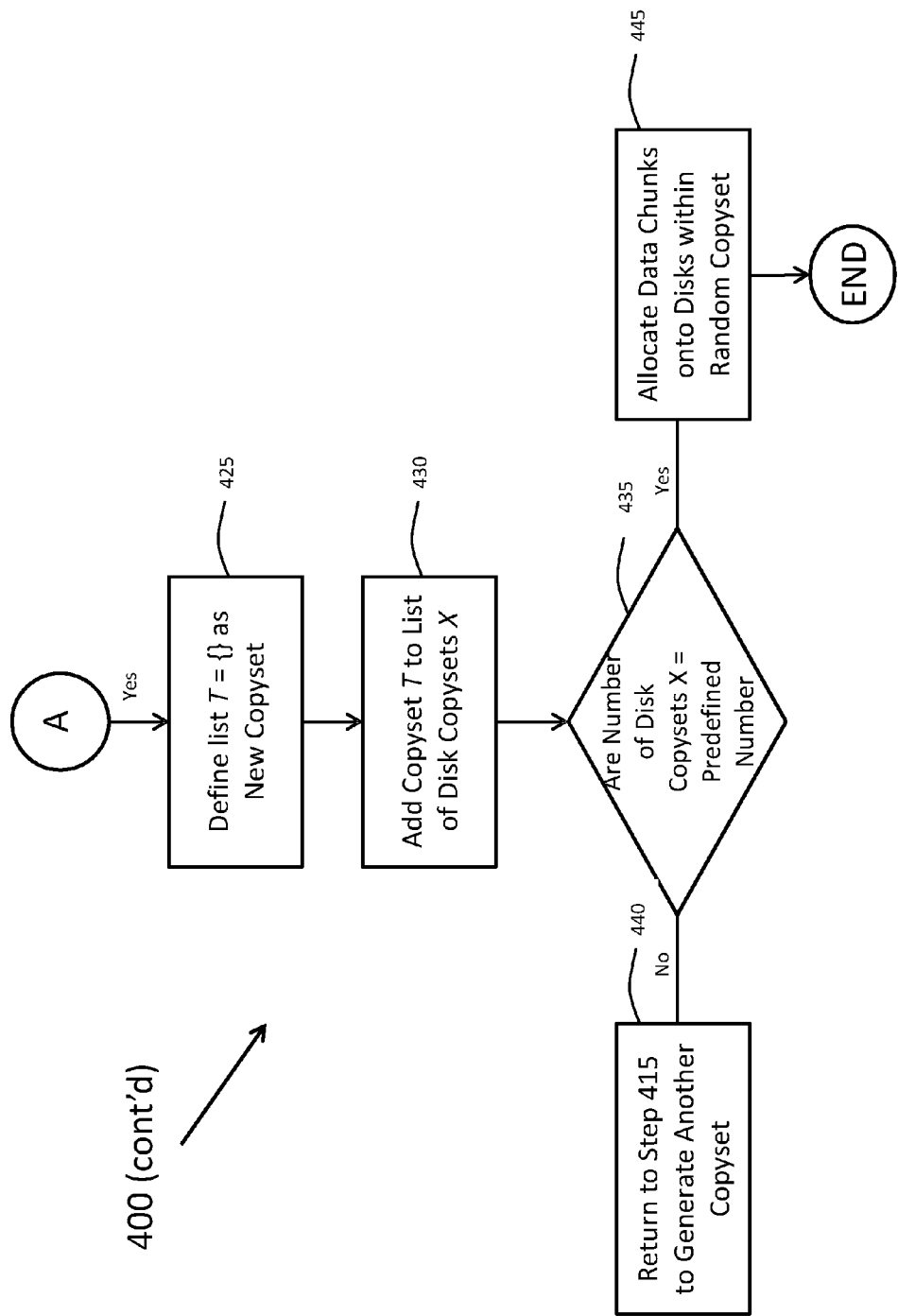

FIG. 4 illustrates a flowchart for a method of performing distributed data storage according to an exemplary aspect. As shown, the method 400 provides an algorithm for generating disk copysets and distributing chunks of data onto the disk copysets according to an exemplary aspect.

In general, the method provides a heuristic algorithm to generate a plurality of copysets of disks designated for allocation of the initial block of data. Initially, at step 405, the system and method determines a list of x disk copysets to be generated. According to an exemplary aspect, the list is based on a heuristic choice considering a balance between the storage reliability and recovery performance. For example, the maximum X would be chosen at which failure probability is below some given value (e.g., usually this value is fixed by some quality of service agreement or other business requirements). Typically, this value of x disk copysets would be between 2 and 10. The number of x disk copysets can be stored in memory 116 of computer 110, for example, and accessed accordingly by CPU 114. Next, the method identifies or determines an enumerated list $d_1, \ldots, d_N$ of all the disks in the storage system. According to one aspect, the enumerated disks can be determined by identifying, on each storage server, all available disks and assigning them numbers, and then registering the server and its disks in data management service with the disks each having unique identifications comprised from a server identification and disk identification inside the server. For example, the enumerate list of disks can correspond to disks 122A-122C, 132A-132C and 142A-142C, provided in FIG. 1 as an example. According to the exemplary aspect, the data management module 112 is configured to perform the step 410 of identifying the list D (i.e., equal to $d_1, \ldots, d_N$) by accessing memory 116 that is provided to store this information, by polling the distributed data-storage system, or the like, as would be understood to one skilled in the art.

Next, the method generates a random permutation $d_{i_1}, \ldots, d_{i_N}$ of the list D and partitions the resulting permutation into groups of n disks. According to the exemplary aspect, if at the end of the permutation there are not enough disks for a whole copyset, the system ignores the remaining disks that have not appeared in any copyset. According to one aspect, the system is configured to achieve a scatter coefficient equal to S by generating ~S different permutations of the disks of the storage system. This process is repeated until the necessary number of copysets (i.e., x disk copysets) is obtained.

To form the permutation, as further shown at step 415, CPU 114 applying the data management module 112 is configured to randomly select a disk $d_i$ from list D and add this disk $d_i$ to a list T={ } that provides a list of disks for the specific copyset. As noted above, each copyset is set to include n number of disks. Thus, the data management module 112 further determines at step 420 whether the disks in copyset T={ } is equal to n disks. As shown, if the number of disks is less than n, the process returns to step 415 and selects another random disk (e.g., disk $d_j$ from D) that is added to the set of disks for copyset T={ }.

Once the copyset T={ } includes n number of disks, the method proceeds to step 425 and defines the list T as a copyset to be used for data allocation. At step 430, the data management module 112 is further configured to add copyset T to a list of disk copysets X. If the number of disk copysets X is equal to the predefined number x of disk copysets required for data allocation, the process for allocating disks for the copysets proceeds to step 445. Otherwise, the method proceeds to step 440, which causes a return to step 415 to allocate another set of disks for another copyset. This process is repeated until the number of copysets created equals the predefined number x of copysets needed for the allocation. According to one exemplary aspect, the system is configured to generate ~S different permutations of disks of the storage system to achieve a scatter coefficient equal to S.

Finally at step 445, the data block that is being stored on the distributed data storage system is divided into chunks and each chunk is allocated on a separate disk within one of the plurality of generated copysets. According to an exemplary aspect, this copyset is selected randomly. It is realized that each copyset preferably includes a unique grouping of disks according to the exemplary aspect. Once the data chunks are stored on the disk groupings, the method ends as shown in FIG. 4. According to one additional aspect, it is noted that copyset generation is not performed each time a data block is allocated among disks. Rather, the same copyset list is stored (persistently) and preferably reused by the data management service/module. Moreover, according to an alternative aspect, the copyset is not selected randomly, but rather is selected based on a scheme utilizing heuristic logic. For example, the system and algorithm can be configured to select the copyset that is the closest to the client computer (e.g., in terms of average network latency to servers with the disks from the copyset) or, alternatively, select the copyset where the least amount of data is stored (i.e., if the system and algorithm accounts for the amount of data stored in each copyset).

Applying the exemplary aspect shown in FIG. 4, it is possible that a subset of similar disk copysets may be generated in which pairs of copysets will have several coinciding disks (i.e., overlap in disks between copysets). According to another exemplary aspect, for an optimal partition with a sufficiently large number $N_{Disks}$ of disks and a scatter coefficient $S \ll N_{Disks}$ any two copysets, with high probability, either will not intersect or will have only one coinciding disk. This is because a large number of intersections between copysets prevents a distributed storage system from achieving a maximum increase in speed to recover damaged data due to the paralleling of the loading of data between copysets. Moreover, the intersections between copysets can also lead to non-uniform load distribution over the disks of the system.

According to a refinement of the exemplary aspect, the disclosed system and method generates disk copysets taking into account the presence of failure domains. In general, a failure domain is an area of a computer network or system impacted as a result of some hardware or network failure. When such a failure leads to inaccessibility of the associated domain (e.g., a server), all the disks from this domain are typically found to be inaccessible. The occurrence of a failure domain can be addressed by such parts of the infrastructure of a distributed system as separate servers, and also by separate stacks or groups ("racks") of stacks in the data center.

Thus, according to this exemplary aspect, the method and system takes into account failure domains as special features of the hardware infrastructure of a specific data center to increase the accessibility of the data when a failure affecting all the components of a failure domain. For this, chunks of each block of data are distributed over the disks of the system according to an algorithm such that no single failure domain contains more than one chunk of one block.

It should be appreciated that while distributing data according to failure domains increases the reliability of the storage, this method may decrease performance since the delay in access (latency) between components of different failure domains is, as a rule, longer than that within one failure domain. For example, decoding of a block of data occurs faster if chunks of the block are arranged on different disks (e.g., disks 122A, 122B, 122C) of one physical server (e.g., server 120) than if they are arranged on disks of different servers (e.g., servers 120, 130 and 140). Moreover, taking into account scalability of the system, it is preferable to minimize the volume of data transmitted by slow data channels and to localize a large part of the network communications within separate network segments.

Thus, according to this exemplary aspect, the system is configured to identify the "optimal level" (e.g., the server, stack, group of stacks, etc.) of a failure domain taking into account system reliability, on the one hand, and performance and scalability, on the other. Moreover it should be appreciated that such choice further depends on the requirements to be made of the system. For example, in one instance, disks can be combined into groups for each copyset in correspondence with selected failure domains. Thus, referring to FIG. 1, each of servers 120, 130 and 140 can be chosen as a separate failure domain. In this exemplary aspect, because failure domains are taken into account to generate the copysets, the set of disks of the system is partitioned into nonintersecting subsets that correspond to the different failure domains (e.g., each of servers 120, 130 and 140). Thus, when disks for copyset are selected based on failure domains, there should be no more than one disk belonging to one failure domain in any of the disk copysets generated.

Thus, referring back to FIG. 4, to implement this aspect, the method shown in FIG. 4 is modified at step 315 by selecting disks that belong to an identified failure domain that is not yet present in the copyset T being filled, rather than randomly selecting a disk from the list D (i.e., equal to $d_1, \ldots, d_N$). It should be appreciated that according to the exemplary aspect, the number of failure domains in the storage system should not be less than the parameter n in the noiseless-coding scheme being used.

According to yet another aspect, the method disclosed herein is provided to generate disk copysets taking into account the presence of failure domains as well as locality groups. In generally, locality should be understood that at least k chunks (preferably, chunks of the initial data block, and not chunks of the control sums) of a data block to be stored should be allocated on closely positioned (i.e., based on network topology) disks of the selected copyset to increase speed of data access. According to another exemplary aspect, locality is taken into account when selecting a copyset for writing the next block in the line (i.e., the algorithm preferably chooses the copyset to be topologically close to the client).

According to the exemplary aspect, locality is defined both based on certain locality functions that takes account the delay in access and the rate of exchange of data between nodes (e.g., servers 120, 130 and 140) of the network 150, and based on distinguishing locality groups, for example, servers arranged within one stack in a data center. According to the exemplary aspect, computer 110 is configured to calculate the locality function for pairs of components based on the average delay in the transmission of messages and further distinguish locality groups according to a configuration specified previously by the administrator of the data-storage system.

By considering locality of the arrangement of components of the distributed data-storage system, the disclosed system and method can minimize the delay in access to the data, decrease the volume of network communications between distant nodes of the network 150, and decrease the load on the communication channels connecting separate stacks in the data center. For example, identifying the locality groups associated with such infrastructural components of a DSS as a group of servers within one stack lowers the load on the communication channels between stacks as a result of localization of the processes of data recovery and load balancing within one stack.

Figure 5:
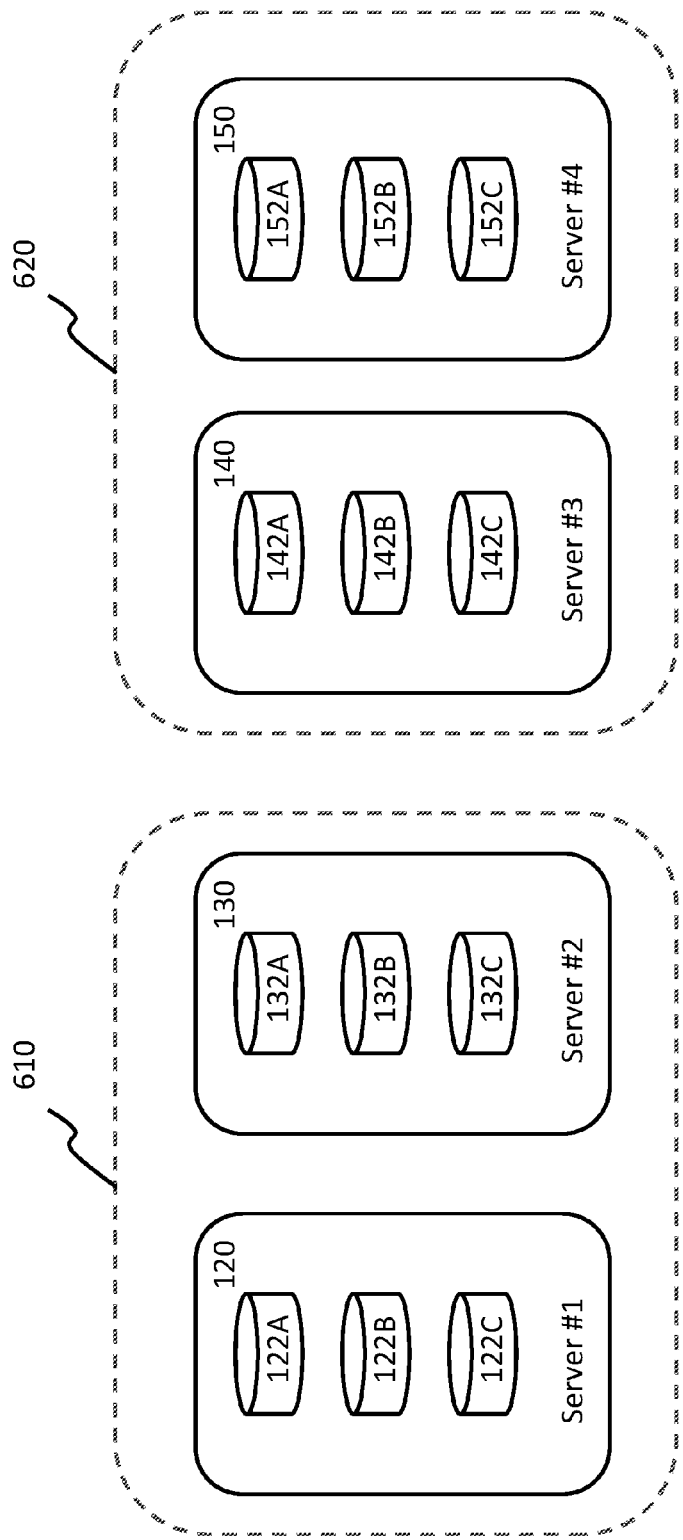
FIG. 5 illustrates an exemplary distributed data storage system according to an exemplary aspect that takes failure domains and locality groups into account.

FIG. 5 illustrates an exemplary distributed data storage system according to this aspect. It should be appreciated that FIG. 5 illustrates the storage nodes (i.e., the servers and associated disks) 120, 130, 140 described above with respect to FIG. 1 and an additional server 150, including disks 152A, 152B and 152C. According to the exemplary aspect, local servers are grouped together to form the copysets for the distributed data storage. As shown, servers 120 and 130 form a first local group of servers 610 and servers 140 and 150 are grouped together to form a second local group of servers 620. It is noted that taking locality groups into account is especially important in data-storage systems using erasure coding rather than replication, since accessing the data it is not sufficiently easy to choose the replica that is closest from the point of view of the network topology and it is often necessary to load from the network several data chunks that can be arranged over the various servers.

According to the exemplary aspect, in the recording of data, one efficient strategy is to arrange data blocks belonging to the same file within one locality group, which effectively increases the speed to access the data. Thus, in this exemplary aspect, the method of allocating data blocks according to the locality group coincides with the method for generating disk copysets based on failure domains as discussed above, except that the generation of copysets occurs separately for each of the locality groups. According to one aspect, the required number of copysets necessary is divided between the locality groups so that the number of copysets for each group is proportional to the number of disks in the group. In this aspect, uniform loading over the disks can be obtained as would be understood to one skilled in the art.

FIG. 6 illustrates a flowchart for a method of performing distributed data storage according to another exemplary aspect. The method illustrated in FIG. 6 is similar to the method described above with respect to FIG. 4, except that the algorithm further takes into account the network proximity of components of the data-storage system when generating the disks copyset.

According to one aspect, for all nodes $N_i$ that exist in a distributed data-storage system, the system can define a distance function $S(N_i, N_j)$, which is equal to the average network delay in transmission of a message between nodes $N_i$ and $N_j$. Thus, the distance $S(N_i, N_j)$ can be considered equal to zero if $N_i = N_j$ and equal to infinity when it is impossible to obtain access to node $N_i$ of the system from node $N_j$.

It should be appreciated that a given distance function may be non-static and change with time because of changes in the distributed system. In particular, the distance function may change dynamically with time because of changes in the hardware configuration of the system and also because of oscillations in the loading of the network channels that connect the nodes of the system. According to one aspect, each node (e.g., each of servers #1, #2, and #3 of FIG. 1) is configured to collect data about the average load during exchange of messages separately and can then periodically circulate messages to all network nodes it communicates with, or to a certain chosen subset, in order to avoid superfluous communications with distant nodes of the network. As the characteristic time interval over which the circulation of messages occurs, the computer 110 is configured to select an interval, for example, from a few minutes to several tens of minutes, in order to decrease the load on the system due to the system messages. At that time, the data will be sent to a certain earmarked monitoring server that gathers together information about the state of the system as a whole. The role of the monitoring server in the system can be taken on by the data management service/module responsible for the allocation of blocks on the data-storage servers and also for the recovery and migration of data.

According to the exemplary aspect, the computer 110 is configured to select disk copysets based on minimization of the distance (i.e., from the point of view of the network topology) between the nodes. However, if the system does not take other parameters into account, the resulting distribution of data can lead to a non-uniform distribution of disks over the generated copysets and correspondingly to a non-uniform distribution of data over the disks of the system. Thus, to minimize this non-uniform distribution, the disclosed system is configured to determine the "weight" of a disk, which corresponds to the volume of useful system data stored on said disk. According to one aspect, the amount for the "weight" can be stored by the distributed storage system as a metadata.

In turn, this weight is taken into account to generate data copysets such that the algorithm preferably selects the least filled disks. In this approach, disk copysets will be generated as data is added to the system until the number of copysets reaches the threshold value indicated when the system is configured. At this point, new copysets will be generated as nodes in the system are added or removed and in the process of load balancing.

According to the exemplary aspect, the system defines $S(D_i, D_j, w_j)$ as a modified distance function from disk $D_i$ to disk $D_j$ that takes into account the filling of the disks, with $w_j$ being the current weight of disk $D_j$. It should be appreciated that with this definition the distance from disk $D_i$ to disk $D_j$ can differ from the distance from disk $D_j$ to disk $D_i$. According to the exemplary aspect, the computer 110 (and more specifically, CPU 114) is configured to calculate the modified distance function as a linear combination from the distance based on the network topology and the disk weight $w_j$. According to one exemplary aspect, the coefficients of the terms in the linear combination can be used for fine-tuning of the operation of the system under different conditions.

Figure 6A:
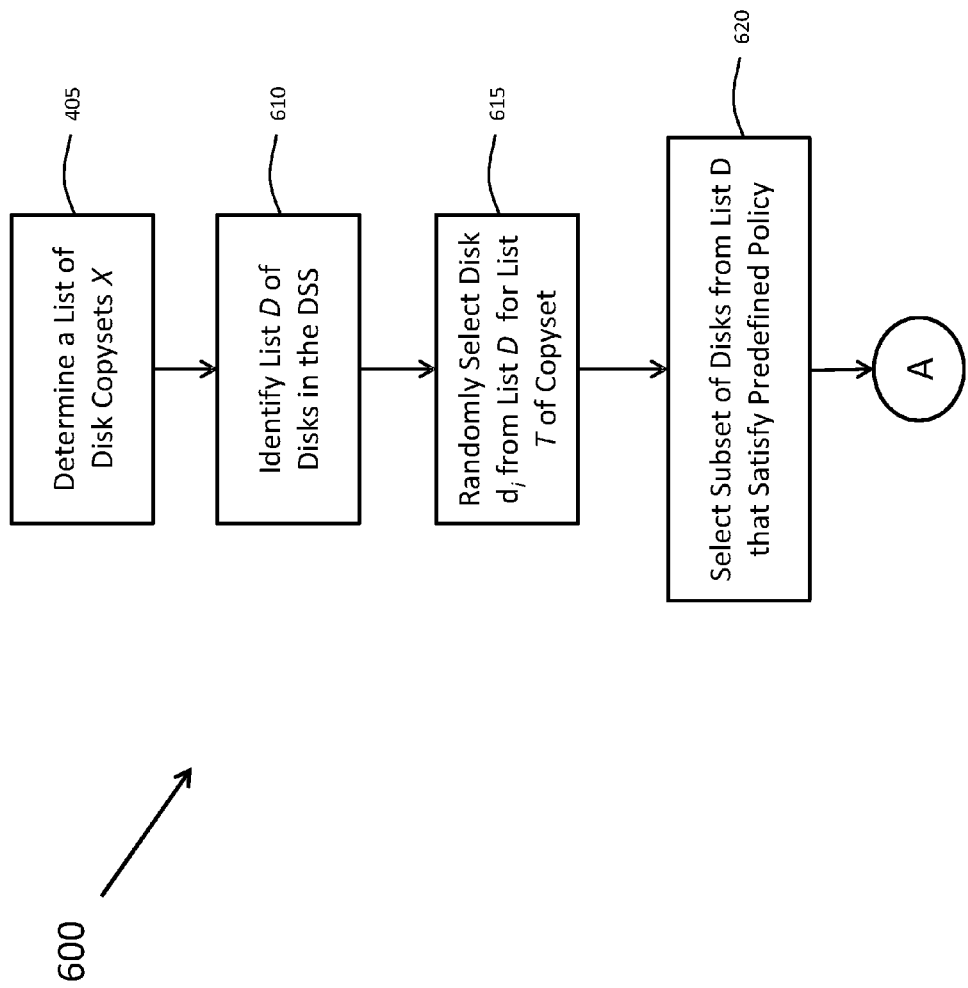
Figure 6C:
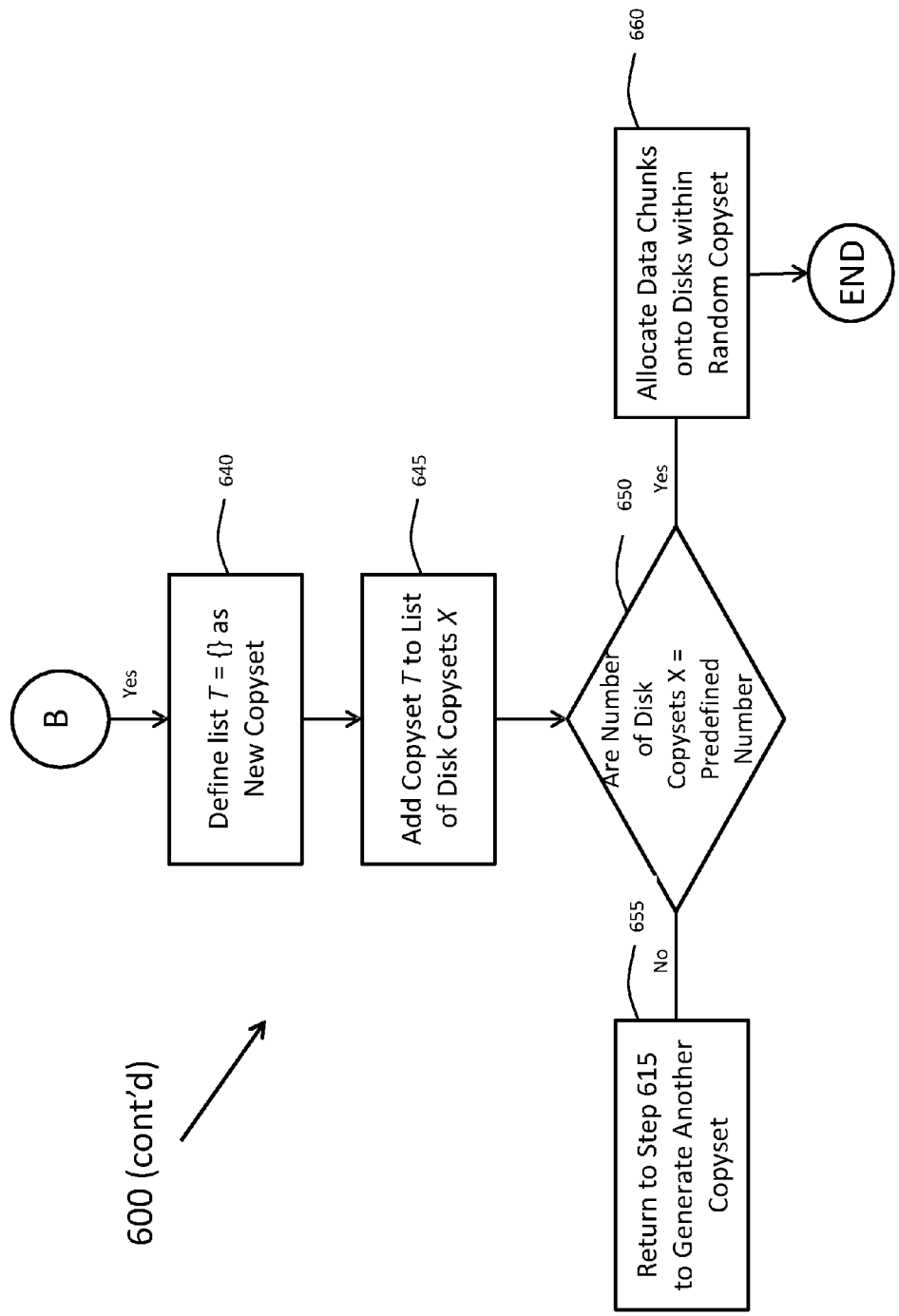

As shown in FIGS. 6A-6C, a method 600 is illustrated for performing distributed data storage taking into account the distance based on the network topology and the disk weight $w_j$. Similar to the method described above for FIG. 4, initially, at step 605, the system and method determines a list of x disk copysets to be generated. Next, at step 610, according to the exemplary aspect, the method identifies or determines an enumerated list D of $\{d_1, \ldots, d_N\}$ of all the disks in the storage system. For example, the enumerated list of disks can correspond to disks 122A-122C, 132A-132C and 142A-142C, provided in FIG. 1 as an example. According to the exemplary aspect, CPU 114 applying the data management module 112 is configured to perform the step 410 of identifying the list D (i.e., equal to $d_1, \ldots, d_N$) by accessing memory that is provided to store this information, by polling the distributed data-storage system, or the like, as would be understood to one skilled in the art.

For purposes of the exemplary aspect, a two-dimensional array of distances between the system nodes to which disks $d_i$ and $d_j$ belong is defined as $S=\{S_{ij}\}$, i, j∈[1,N]. For effectiveness of search, this array can be stored in the memory of computer 110 in the form of a set of lists, sorted according to increase of distance, each of which lists corresponds to a specific disk (e.g., disks 122A-122C, 132A-132C and 142A-142C) in the system.

Next, at step 615, the computer 110 randomly selects a disk $d_i$ from the list D of disks $\{d_1, \ldots, d_N\}$ and added to a copyset $T=\{d_i\}$ as a new copyset of disks. At step 620, the computer 110 selects from the list D one or more random disks $d_{i_1}, \ldots, d_{i_k}$ that satisfy a preset policy for data distribution associated with the first randomly selected disk $d_i$. For example, according to one aspect, this subset of disks can be selected according to failure domains as discussed above. Then, for a selected disk $d_{i_j}$ within this subset, the system further the expanded list T'=T ∪ $d_{i_j}$. For each disk from the given expanded list, the computer 110 is configured to calculate the total distance to all the other disks in the subset, and then calculate the average total distance based on network topology, for example. Then, from the set of disks $d_{i_1}, \ldots, d_{i_k}$, the computer 110 selects the disk with the smallest calculated average total distance for the expanded disk list T', and add this disk to the copyset T (along with disk $d_i$).

As further shown, in a similar manner as described above with respect to FIG. 4, the computer 110 continues to build the Copyset T at step 635 by determining whether the disks in copyset T={ } is equal to n disks. As shown, if the number of disks is less than n, the process returns to step 630 and selects another random disk (e.g., disk $d_j$ from D) that is added to the set of disks for copyset T={ }. Preferably, the next disk selected will be the disk with the second smallest calculated average total distance. This process is repeated until the number of disks in copyset T is equal to n disks in the list.

Once the copyset T={ } includes n number of disks, the method proceeds to step 640 and defines the list T as a copyset. At step 645, the data management module 112 is further configured to add copyset T to a list of disk copysets X. If the number of disk copysets X is equal to the predefined number x of disk copysets (step 650), the process for allocating disks for the copysets proceeds to step 660. It should be appreciated that according to an alternative aspect, more than X copysets can be generated from which X copysets will be selected with minimal average distance between the disks in the copyset from all generated copysets. In any event, when the method proceeds to step 655, a return to step 615 is performed to allocate another set of disks for another copyset. This process is repeated until the number of copysets created equals the predefined number of copysets needed for the allocation.

Finally at step 660, the initial data block to be stored on the distributed data storage system is divided into chunks and each chunk is stored on one of the disks within the randomly selected copyset. Once the data chunks are stored on the disk groupings, the method ends as shown in FIG. 6C.

It should be appreciated that the given algorithm uses a heuristic method of generating copysets that is not strictly optimal from the point of view of the introduced distance function between nodes of the network and weights of disks. However, it should also be appreciated that using a strictly optimal algorithm in a real distributed system is not practical because of the large overheads associated with analysis of the whole array of disks in the generation of each copyset.

According to a further aspect of the system, the computer 110 is configured to facilitate the addition of a disk to the data-storage system. In particular, when a new disk is added to the storage system for a scheme of allocation with scatter coefficient S, the computer 110 is configured to randomly generate S new copysets taking into account the policies being used for allocation of the type of domains as described above. This allocation is particularly effective if in the DSS there are enough disks to ensure that disk copysets that will have no more than one disk in common with any of the other copysets will be generated with high probability. For example, a DSS system having a large number of total nodes or disks and a rather small number n of disks per copyset would result in a low probability of having more than one disk overlap.

According to yet another exemplary aspect, the computer 110 is configured to efficiently remove a disk from the distributed data-storage system. It should be understood that a disk may need to be removed from the system because the disk is temporarily inaccessible (e.g. as a result of temporary inaccessibility of a corresponding server as a result of a power switch off or a network failure or the like), the disk has crashed, or that the given disk is excluded from the configuration of the data storage system. In these instances, when a disk is removed from the system, in each of the disk copysets containing said disk we replace the removed disk by a new disk. According to an exemplary aspect, the new disk can be chosen randomly from the set of disks of the system in accordance with the policies being used for allocation of data as described above. As further noted above, when the system has a large number of disks, it is likely that the disk sets obtained will have no more than one disk in common with any of the disk copysets.

Furthermore, it should be appreciated that, depending on the configuration of the storage system, it is not always possible to satisfy fully the demands made by the algorithm on the allocation of data for the current configuration of the storage system, and in this case some disk copysets may be chosen without satisfying one or several conditions. Later on, when the hardware configuration of the storage system is changed, it can become possible to generate copysets satisfying the initial conditions, and to implement the migration of data.

According to yet a further exemplary aspect, the system is configured to perform efficient load balancing for the developed allocation scheme. In particular, load balancing when the given scheme of allocation is used presupposes the migration of blocks corresponding to one disk copyset to another disk copyset. The balancing process for the scheme developed presupposes larger overheads than for a random scheme of allocation, since it presupposes with high probability the migration of all chunks (because of the minimal intersection between different sets of disks). For a random scheme migration of only one chunk is possible (e.g. from the disk that is fullest or most loaded with interrogations). A merit of the proposed scheme of allocation of data is the possibility of collecting and analysing the statistics of access to the data that pertain to specific disk copysets, and not only to separate disks, and this makes it possible to find the most loaded and least loaded copysets. Moreover, it should be appreciated that the overhead can be decreased by increasing the parameter X, i.e., the number of copysets in the system as described above.

Figure 7:
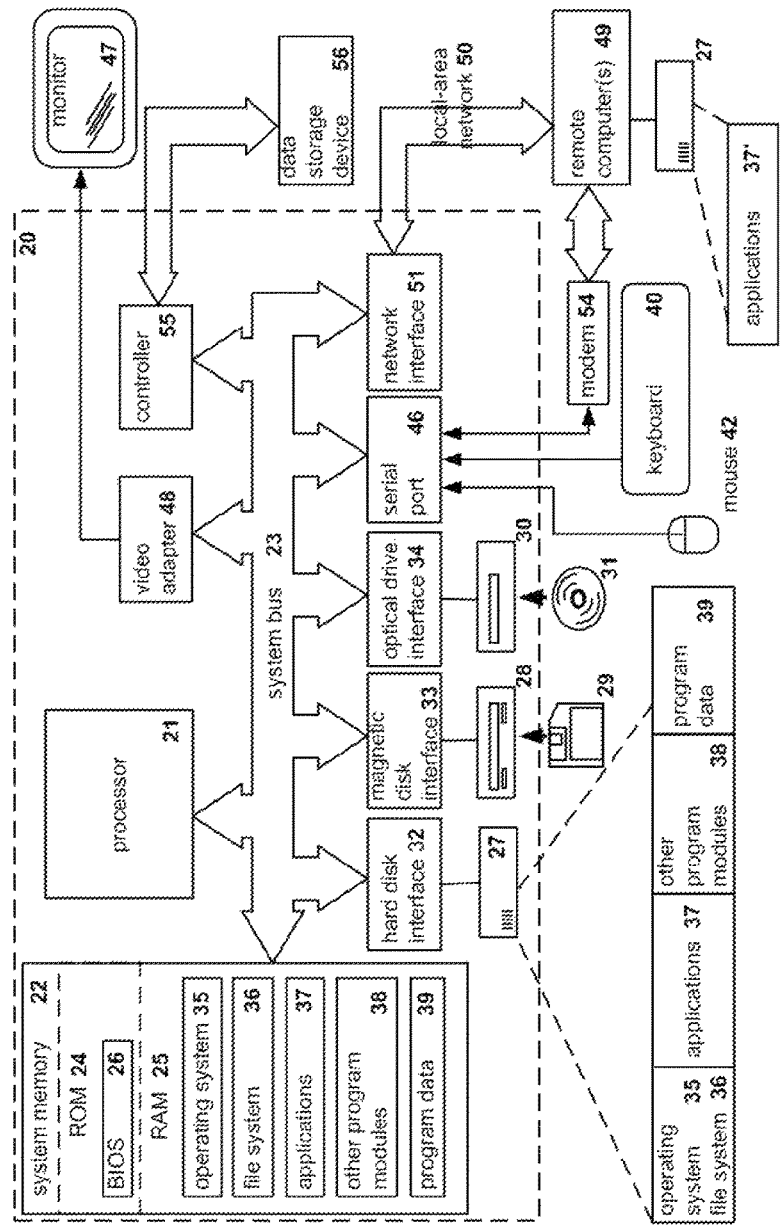
FIG. 7 illustrates an example of a general-purpose computer system on which the disclosed systems and method can be implemented.

FIG. 7 illustrates an example of a general-purpose computer system (which may be a personal computer or a server) on which the disclosed systems and method can be implemented according to an example aspect. It should be appreciated that the detailed general-purpose computer system can correspond to the computer 110 described above with respect to FIG. 1. Moreover, the remote computer(s) 49, as described below, can correspond to the nodes (e.g., servers 120, 130, and 140) discussed above with respect to the exemplary system and method.

As shown in FIG. 7, the computer system 20 includes a central processing unit 21, a system memory 22 and a system bus 23 connecting the various system components, including the memory associated with the central processing unit 21. The central processing unit 21 can correspond to the CPU 114 and the system memory 22 can correspond to memory 116 of FIG. 1, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for storing a block of data in a distributed data-storage system, the method comprising:
   identifying, by a processor, a list of a plurality of disks in the distributed data-storage system;
   selecting, by the processor, a disk from the list of the plurality of disks based on a respective identified failure domain of the selected disk and adding the selected disk to a copyset comprising a candidate subset of the disks designated for allocation of different chunks of the block of data;
   continuously performing, by the processor, the step of selecting a disk based on a respective failure domain and adding the disk to the copyset until the copyset contains a predetermined amount of allocated disks from the distributed data-storage system;
   repeating, by the processor, the selecting and continuously performing steps to allocate a plurality of subsets of disks for a plurality of copysets, respectively, such that is no more than one disk belonging to a particular failure domain in any of the plurality of copysets;

generating, by the processor, a plurality of data chunks divided from the block of data, wherein an amount of data chunks is equal to the predetermined amount of allocated disks, wherein at least one data chunk includes erasure encoding for the block of data;

selecting a copyset from the plurality of copysets; and distributing, by the processor, the data chunks onto disks of the selected copyset.

2. The method according to claim 1, further comprising removing the selected disk from the list of the plurality of disks once the selected disk is added to the copyset.

3. The method according to claim 1, further comprising:

identifying a respective failure domain for each of the plurality of disks in the distributed data-storage system, wherein a failure domain is configured such that an occurrence of a hardware failure within a respective failure domain results in all disks in the same failure domain being inaccessible.

4. The method according to claim 3, further comprising:

determining a plurality of locality groups of the plurality of disks in the distributed data-storage system, wherein the step of distributing the data chunks onto respective disks of the respective copyset comprises distributing at least a portion of the data chunks within at least one of the locality groups.

5. The method according to claim 1, further comprising:

calculating a total distance from the selected disk to each of a portion of the plurality of disks; and adding additional disks to the subset of disks allocated for the copyset based on the disks having the smallest calculated total distance from the selected disk.

6. The method according to claim 5, wherein the total distance is calculated based on network topology of the distributed data-storage system and respective weights of each of the plurality of disks, wherein the respective weights corresponds to a volume of system data stored on each disk.

7. The method according to claim 1, wherein the selecting the copyset from the plurality of copysets comprises randomly selecting the copyset from among the plurality of copyset.

8. A distributed data-storage system for storing a block of data, the system comprising:

a plurality of disks configured to store data; and a processor configured to:

identify a list of the plurality of disks, select a disk from the list of the plurality of disks based on a respective identified failure domain of the selected disk and add the selected disk to a copyset comprising a candidate subset of the disks designated for allocation of different chunks of the block of data;

continuously select additional disks from the list of the plurality of disks based on a respective identified failure domain and add the additional disks to the copyset until the copyset contains a predetermined amount of allocated disks from the distributed data-storage system, repeat the selecting the disk and the additional disks to allocate a plurality of subsets of disks for a plurality of copysets, respectively, such that is no more than one disk belonging to a particular failure domain in any of the plurality of copysets, generate a plurality of data chunks from the block of data, wherein an amount of data chunks is equal to the predetermined amount of allocated disks, wherein at least one data chunk includes erasure encoding for the block of data, select a copyset from the plurality of copysets; and randomly distribute the data chunks onto disks of the selected copyset.

9. The system according to claim 8, wherein the processor is further configured to remove the selected disk from the list of the plurality of disks once the selected disk is added to the copyset.

10. The system according to claim 8, wherein the processor is further configured to:

identify a respective failure domain for each of the plurality of disks in the distributed data-storage system, wherein a failure domain is configured such that an occurrence of a hardware failure within a respective failure domain results in all disks in the same failure domain being inaccessible.

11. The system according to claim 10, wherein the processor is further configured to:

determine a plurality of locality groups of the plurality of disks in the distributed data-storage system, and distribute the data chunks onto respective disks of the respective copyset by distributing at least a portion of the data chunks within at least one of the locality groups.

12. The system according to claim 8, wherein the processor is further configured to:

calculate a total distance from the selected disk to each of a portion of the plurality of disks, and add the additional disks to the subset of disks allocated for the copyset based on the disks having the smallest calculated total distance from the selected disk.

13. The system according to claim 12, wherein the total distance is calculated based on network topology of the distributed data-storage system and respective weights of each of the plurality of disks, wherein the respective weights corresponds to a volume of system data stored on each disk.

14. The system according to claim 8, wherein the processor is further configured to select the copyset from the plurality of copysets by randomly selecting the copyset from among the plurality of copyset.

15. A non-transitory computer readable medium storing computer executable instructions for storing a block of data in a distributed data-storage system, including instructions for:

identifying, by a processor, a list of a plurality of disks in the distributed data-storage system;

selecting, by the processor, a disk from the list of the plurality of disks based on a respective identified failure domain of the selected disk and adding the selected disk to a copyset comprising a candidate subset of the disks designated for allocation of different chunks of the block of data;

continuously performing, by the processor, the step of selecting a disk based on a respective failure domain and adding the disk to the copyset until the copyset contains a predetermined amount of allocated disks from the distributed data-storage system;

repeating, by the processor, the selecting and continuously performing steps to allocate a plurality of subsets of disks for a plurality of copysets, respectively, such that is no more than one disk belonging to a particular failure domain in any of the plurality of copysets;

generating, by the processor, a plurality of data chunks divided from the block of data, wherein an amount of data chunks is equal to the predetermined amount of allocated disks, wherein at least one data chunk includes erasure encoding for the block of data;

selecting a copyset from the plurality of copysets; and randomly distributing, by the processor, the data chunks onto disks of the selected copyset.

16. A non-transitory computer readable medium according to claim 15, further including instructions for removing the selected disk from the list of the plurality of disks once the selected disk is added to the copyset.

17. A non-transitory computer readable medium according to claim 15, further including instructions for:
identifying a respective failure domain for each of the plurality of disks in the distributed data-storage system, wherein a failure domain is configured such that an occurrence of a hardware failure within a respective failure domain results in all disks in the same failure domain being inaccessible.

18. A non-transitory computer readable medium according to claim 17, further including instructions for:
determining a plurality of locality groups of the plurality of disks in the distributed data-storage system,
wherein the step of distributing the data chunks onto respective disks of the respective copyset comprises distributing at least a portion of the data chunk within at least one of the locality groups.

19. A non-transitory computer readable medium according to claim 15, further including instructions for:
calculating, by the processor, a total distance from the selected disk to each of a portion of the plurality of disks; and
adding additional disks to the subset of disks allocated for the copyset based on the disks having the smallest calculated total distance from the selected disk.

20. A non-transitory computer readable medium according to claim 19, further including instructions for calculating the total distance based on network topology of the distributed data-storage system and respective weights of each of the plurality of disks, wherein the respective weights corresponds to a volume of system data stored on each disk.

21. A non-transitory computer readable medium according to claim 19, wherein the instructions for selecting the copyset from the plurality of copysets comprises randomly selecting the copyset from among the plurality of copyset.

* * * * *